US009739151B2

(12) United States Patent
Stiehler

(10) Patent No.: US 9,739,151 B2
(45) Date of Patent: Aug. 22, 2017

(54) BLADE, INTEGRALLY BLADED ROTOR BASE BODY AND TURBOMACHINE

(75) Inventor: Frank Stiehler, Bad Liebenwerda (DE)

(73) Assignee: MTU Aero Engines GmbH, Munich (DE)

(*) Notice: Subject to any disclaimer, the term of this patent is extended or adjusted under 35 U.S.C. 154(b) by 746 days.

(21) Appl. No.: 13/461,106

(22) Filed: May 1, 2012

(65) Prior Publication Data

US 2012/0282109 A1 Nov. 8, 2012

(30) Foreign Application Priority Data

May 2, 2011 (EP) .................................... 11164421

(51) Int. Cl.
*F01D 5/18* (2006.01)
*F01D 5/08* (2006.01)
*F02C 7/18* (2006.01)

(52) U.S. Cl.
CPC ............. *F01D 5/081* (2013.01); *F01D 5/187* (2013.01); *F02C 7/18* (2013.01); *F05D 2240/80* (2013.01); *Y02T 50/671* (2013.01); *Y02T 50/676* (2013.01)

(58) Field of Classification Search
CPC . F01D 5/081; F01D 5/08; F01D 5/085; F01D 5/087; F05D 2240/81
USPC ......... 415/115, 116, 173.1, 173.7; 416/96 R, 416/96 A, 97 R, 97 A, 193 A, 193 R
See application file for complete search history.

(56) References Cited

U.S. PATENT DOCUMENTS 3,171,631 A 3/1965 Aspinwall
3,291,447 A * 12/1966 Brandon ...................... 415/111
3,443,790 A 5/1969 Buckland
3,729,930 A * 5/1973 Williams .................. F01D 5/08 415/116
3,834,831 A * 9/1974 Mitchell ......................... 416/95
3,847,506 A * 11/1974 Straniti ..................... 416/244 R
3,989,412 A * 11/1976 Mukherjee .................. 416/97 R
4,910,958 A 3/1990 Kreitmeier
5,125,794 A * 6/1992 Detanne ........................ 415/115
5,135,354 A * 8/1992 Novotny ....................... 415/115
5,951,250 A * 9/1999 Suenaga et al. ............ 416/96 R
2003/0086785 A1* 5/2003 Bunker et al. ................ 415/115
2005/0201857 A1* 9/2005 Ferra et al. ................... 415/115
2008/0298969 A1* 12/2008 Bunker ......................... 416/182
2009/0116953 A1* 5/2009 Spangler et al. ............. 415/115
2009/0223202 A1* 9/2009 Nanataki et al. ............... 60/224
2010/0178155 A1* 7/2010 Inomata et al. .................. 415/1

(Continued)

FOREIGN PATENT DOCUMENTS

DE 10 2007 037 208 A1 2/2009
DE 10 2009 007 468 A1 8/2010

(Continued)

OTHER PUBLICATIONS

European Search Report, dated Oct. 27, 2011, 9 pages total.

*Primary Examiner* — Justin Seabe

(74) *Attorney, Agent, or Firm* — Crowell & Moring LLP

(57) ABSTRACT

A blade for a turbomachine is disclosed. At least one cooling channel is configured in the blade neck, whose inlet is disposed near a platform projection on the high-pressure side and whose outlet is disposed in the region of a platform projection on the low-pressure side. An integrally bladed rotor base body having a plurality of these types of blades as well as turbomachine with such a rotor base body is also disclosed.

11 Claims, 2 Drawing Sheets

1 2 30 54 32 56 34 40 4 12 16 14 42 46 36 10 18 58 8 38 20 60 50 24 26 6 22 28 48 44

(56) References Cited

U.S. PATENT DOCUMENTS

| | | | | |
|---|---|---|---|---|
| 2010/0239430 | A1* | 9/2010 | Gupta | F01D 5/14 416/97 R |
| 2010/0247284 | A1* | 9/2010 | Gregg et al. | 415/1 |
| 2011/0255991 | A1 | 10/2011 | Borufka et al. | |
| 2011/0274536 | A1* | 11/2011 | Inomata et al. | 415/178 |
| 2012/0036864 | A1* | 2/2012 | Riazantsev et al. | 60/782 |

FOREIGN PATENT DOCUMENTS

| | | | |
|---|---|---|---|
| EP | 0 313 826 | A1 | 5/1989 |
| EP | 1 452 688 | A1 | 9/2004 |
| EP | 1 788 192 | A2 | 5/2007 |
| GB | 452412 | A | 8/1936 |
| GB | 2 095 765 | A | 10/1982 |
| JP | 60-43101 | A | 3/1985 |

* cited by examiner

BLADE, INTEGRALLY BLADED ROTOR BASE BODY AND TURBOMACHINE

This application claims the priority of European Patent Document No. EP 11164421.7, filed May 2, 2011, the disclosure of which is expressly incorporated by reference herein.

BACKGROUND AND SUMMARY OF THE INVENTION

The invention relates to a blade for a turbomachine, an integrally bladed rotor base body, as well as a turbomachine.

This type of blade for a turbomachine is disclosed, for example, in German Patent Application DE 10 2009 007 468 A1. It has a blade root, a blade neck, a blade pan and a platform configured between the blade neck and the blade pan, the platform having a front projection and a rear projection, as viewed in the flow direction of a hot gas flow, for the radially inner limiting of an annular space through which a hot gas flow streams and thus for delimiting a cooling air flow from the hot gas flow. Configured in the blade root is a cooling channel extending in the flow direction, via which the cooling air is guided in an internal blade pan cooling air system. For the purposeful guidance of the cooling air in the cooling air system, the cooling channel is sealed on its downstream outlet by a sealing element in the axial direction or at least the cross section is reduced. Even though this produces good cooling of the blade per se, the cooling air flow is strongly diverted or influenced. In addition, the blade roots are configured such that a passage is respectively formed between them, which is limited toward the annular space by laterally touching platform surfaces and through which the cooling air is able to flow from the high-pressure side to the low-pressure side. However, the passage may also be at least reduced in terms of cross section by the sealing element downstream from the blades. In order to prevent a gas exchange between the hot gas flow and the cooling air flow through the laterally touching platform surfaces, a seal is disposed between the same. In the event of damage to the seal, however, a considerable gas exchange may occur.

The object of the invention is creating a blade for a turbomachine in which the foregoing disadvantages are eliminated and in which an optimized cooling is made possible with an at least almost unimpeded flow-through of cooling air and with a structural delimiting of the hot gas flow from the cooling air flow. Furthermore, the object of the present invention is creating an integrally bladed rotor as well as a turbomachine.

A blade according to the invention for a turbomachine has a blade root, a blade neck, a blade pan and a platform configured between the blade neck and the blade pan, the platform having a front projection and a rear projection, as viewed in the flow direction of a hot gas flow, for delimiting a cooling air flow from the hot gas flow. According to the invention, the blade has at least one cooling channel for guiding at least one cooling air partial flow through the blade neck, whose inlet is disposed in the region of the front projection and whose outlet is disposed in the region of the rear projection.

Because of the at least one cooling channel on the blade-neck side, an unimpeded flow-through of at least one cooling air partial flow is able to take place, thereby achieving a high level of cooling of the blade in the neck region. In addition, the guidance of at least this cooling air partial flow is structurally separated from the guidance of the hot gas flow, which considerably hinders an undesired gas exchange. In particular, heat-conducting cross sections of the blade neck are reduced and heat-dissipating surfaces of the blade neck are increased, whereby a greater temperature gradient can be adjusted between a cold rotor hub and the hot blade pan. Load-bearing cross sections of the blade pan are put further outward in the circumferential direction, thereby making the blade pan stiffer and making it possible to design the blade neck with a reduced mass. Mass is hereby removed from the bending line, which also has a beneficial effect on the vibration behavior and running behavior of the blade. The at least one cooling channel may already be integrated during blade production or else afterward, for example, by means of electro-chemical processing such as ECM or PECM. Moving components for cooling the blade neck as well as attachment parts such as deflector plates and the like are not required. In addition, the cooling of the blade neck according to the invention may be combined with an internal blade pan cooling. It is expressly noted that these types of blades are suited both for integral attachment to a rotor hub or a base body of a rotor to produce an integrally bladed rotor base body as well as for detachable mounting on a base body of a rotor.

In the case of a preferred exemplary embodiment, the at least one cooling channel has a section with an expanded cross section between the inlet and the outlet. This creates a large volume cavity in the blade neck, thereby achieving a further increase in the heat-dissipating surfaces and appreciably reducing the wall thicknesses of the blade neck, which impedes the storage of heat. In addition, the weight of the blade is reduced.

In the case of one exemplary embodiment, at least one turbulator for vortexing the cooling air partial flow is disposed in the at least one cooling channel, thereby effecting an improved heat transfer from the heated blade neck walls to the cooling air partial flow.

However, so as not to withdraw too much kinetic energy from the cooling air partial flow and thereby weaken the cooling of the subsequent rows of blades, it is advantageous if the at least one turbulator is essentially located outside of or next to a fictitious channel axis extending between the inlet and the outlet.

The inflow as well as outflow of at least one cooling air partial flow can be improved in that the inlet and the outlet are aligned such that a swirl of the cooling air flow is utilized. Alternatively, the inlet and the outlet may also be aligned such that the swirl of the cooling air flow is prevented. In addition, the at least one cooling air partial flow may be improved by so-called "pumping," which is achieved in that the channel axis is pointed diagonally outwardly. In other words, the outlet is disposed radially outwardly and the inlet is disposed radially inwardly.

To improve the structural mechanics, it is advantageous, as in one exemplary embodiment, if the at least one cooling channel is aligned according to the blade pan.

In order to guide as much cooling air as possible through the blade neck, one exemplary embodiment has a plurality of cooling channels, for example three channels. The cooling channels are preferably disposed next to each other in the transverse direction of the blade neck and may be separated from each other merely by relatively thin channel walls. The sum of their inlet widths corresponds hereby approximately to the width of the blade neck so that the blade neck in principle has no front-side staunching surfaces against which the cooling air flow could collide.

In order to cool the blade root, the blade root may have two concave side walls. A passage is hereby formed between two adjacent blade roots, through which a cooling air partial flow may also flow.

In order to prevent a gas exchange in the radial direction between the cooling air flow and the hot gas flow in the region of the platforms, in the case of one exemplary embodiment, an insertion groove for accommodating a sealing element is configured in each of the side walls of the blade neck.

A rotor base body according to the invention for a turbomachine has a plurality of blades according to the invention. Because of the reduced heat-transmitting cross sections and the increased heat-dissipating surfaces, the blades enable an adjustment of a sharp temperature gradient between the cold rotor hub and the hot blade pans, thereby allowing a disk or ring geometry that is far to the outside and achieving a reduction in the temperature in critical component regions.

In the case of one exemplary embodiment, the rotor base body is configured in a bling design (bladed ring) or a blisk design (bladed disk) as an integrally bladed rotor base body with integrally attached blades.

In the case of another exemplary embodiment, the rotor base body is provided with detachably mounted blades as a rotor base body.

A turbomachine according to the invention has a rotor with at least one integrally bladed rotor base body according to the invention. Because of the weight-reduced blades, this type of turbomachine has an improved running behavior and a lower fuel consumption.

Other advantageous exemplary embodiments of the invention are the subject of additional dependent claims.

A preferred exemplary embodiment of the invention will be explained in greater detail in the following on the basis of schematic representations.

DETAILED DESCRIPTION OF THE DRAWINGS

Figure 1:
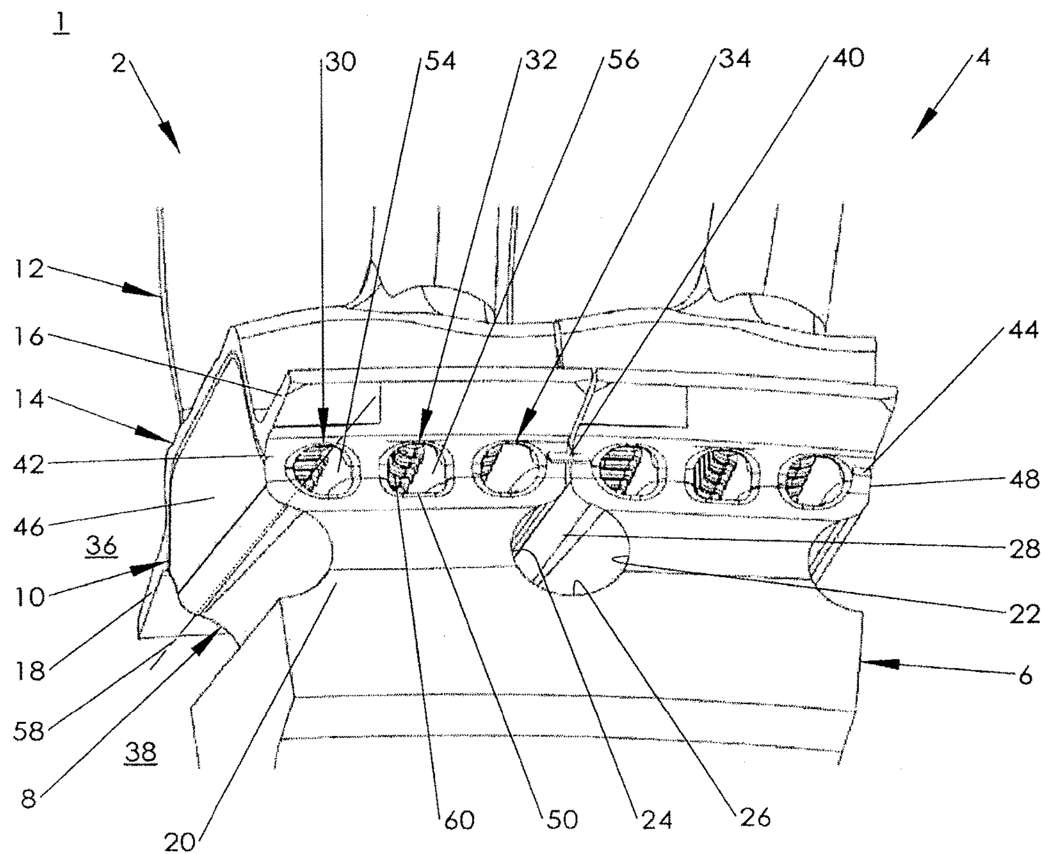
FIG. 1 is a front view of an integrally bladed rotor base body according to the invention in the region of the two adjacent blades according to the invention.
Figure 2:
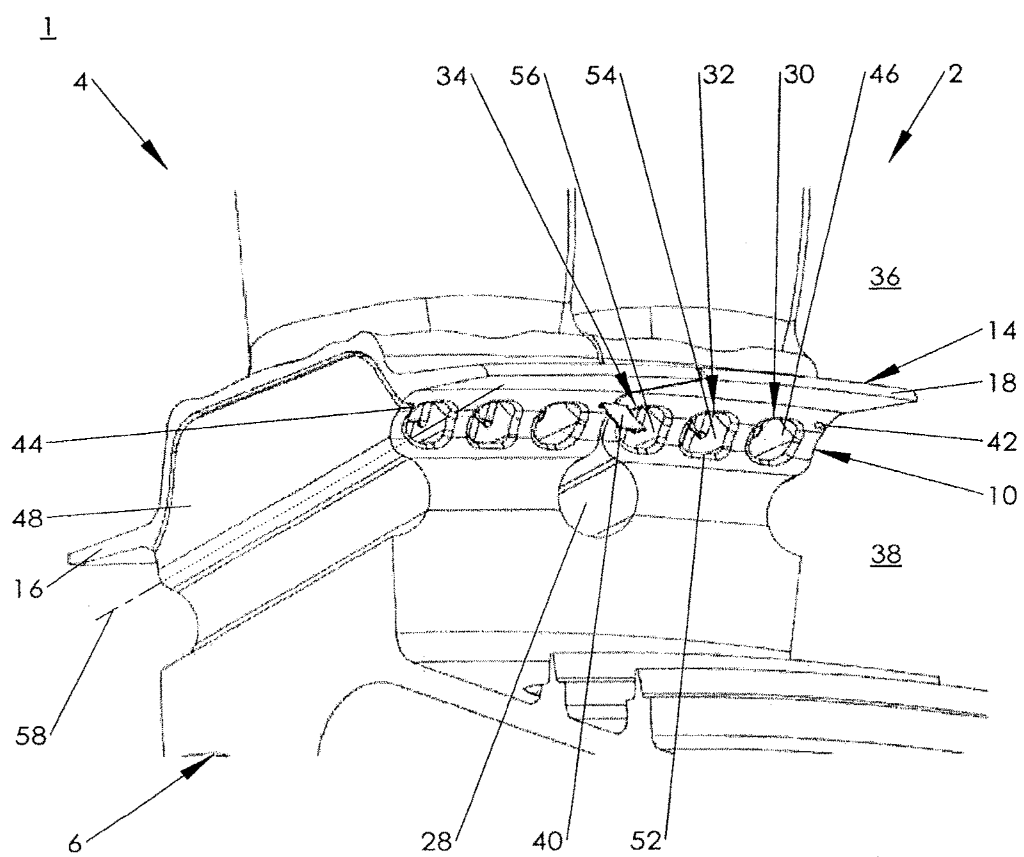
FIG. 2 is a rear view of the rotor base body from FIG. 1.

FIGS. 1 and 2 show a section of an integral rotor base body 1 for a turbomachine such as an aircraft engine in a front view (FIG. 1) and in a rear view (FIG. 2). The rotor base body 1 has a plurality of rotor blades 2, 4 forming a blade row, which are integrally attached to a turbine-side annular or discoid base body 6.

The rotor blades 2, 4 are configured identically so that in the following only the rotor blade 2 is quantified preferentially in more detail representatively for all rotor blades 2, 4 of the rotor base body 1.

The rotor blades 2, 4 each have a blade root 8, a blade neck 10, a blade pan 12 and a platform 14 disposed between the blade neck 10 and the blade pan 12, the platform having a front projection 16 and a rear projection 18 as viewed in the flow direction of a hot gas flow.

The blade root 8 is configured either as an integral part of the rotor blades 2, 4 or as a component that is separately configured and subsequently joined to the rotor blade 2, 4. The blade root has a rectangular cross section and is firmly attached with its radially inward circumferential surface, for example by means of a friction welding method, to a base 20 of the base body 6. It has two concavely configured side walls 22, 24, which merge in a flush manner with a base body wall 26 extending between two bases 20 and delimit a passage between the adjacent blade roots 8 for a cooling air partial flow from the high-pressure side to the low-pressure side. The passage 28 is lined up in such a way with the rotational axis of the rotor base body 1 that it extends, as viewed in the flow direction of the hot gas flow, diagonally radially outwardly (see FIG. 2).

The blade neck 10 is configured to be widened as compared to the blade root 8 as viewed in the circumferential direction. In this case, it is widened in such a way that the passage 28 has an almost circular cross section. Configured in the blade neck 10 are three cooling channels 30, 32, 34 for the guidance of a respective cooling air partial flow through the blade neck 10, which will be explained in further detail in the following.

The platform 14 is formed by the blade neck 10 and delimits with its projections 16, 18 an annular space 36 on the blade-pan side for the hot gas flow from a cooling chamber 38 on the rotor-side for the cooling air flow. The respective adjacent platforms 14 make contact laterally, wherein a sealing element 40 is disposed to prevent a gas exchange between the hot gas flow and the cooling air flow in the radial direction going between the blade necks 10. The sealing element extends in principle from the front projection 16 to the rear projection 18 and is inserted halfway into a respective insertion groove 42, 44 of the side walls 46, 48 of the blade necks 10. To facilitate an ultrasonic test, the side walls 46, 48, which may be solid cast walls, may be configured to be flat.

The blade pan 12 is of a conventional type so that individual explanations are dispensed with. Basically, it may be provided with an internal cooling air system, which is supplied with cooling air via a supply channel discharging into at least one of the cooling channels 30, 32, 34.

The cooling channels 30, 32, 34 are each designed identically or analogously so that the elements or components of the center cooling channel 32 may be provided preferentially with one respective reference number representatively for all cooling channels 30, 32, 34.

The cooling channels 30, 32, 34 have the same cross sections and extend through the blade neck 10 beneath the projections 16, 18 in the flow direction of the hot gas flow in accordance with the depictions in FIGS. 1 and 2. In doing so, the approximately circular inlet 50 thereof is disposed in the region of the front projection 16 and the approximately circular outlet 52 thereof is disposed in the region of the rear projection 18. It is clear that, as viewed in the vertical direction, in the case of a rotation of the rotor base body 1 by 180°, the cooling channels 30, 32, 34 are disposed above the projections 16, 18 and in the case of a rotation by 90° or 270° are disposed laterally to the projections 16, 18. However, the inlets 50 and the outlets 52 are preferably disposed in such a way that a rounded transitional section of the projections 16, 18 in the blade neck 10 form an edge section of the inlets 50 as well as of the outlets 52.

The cooling channels 30, 32, 34 are respectively separated from one each other via a channel wall 54, 56 and have an expanded cross section between the inlet 50 and the outlet 52 in the direction of the platform 14. Because of this expanded section, the cooling channels 30, 32, 34 each have an inner contour that corresponds to an outer contour of the blade neck 10 so that the blade neck 10 is configured virtually as a hollow body, which is divided via the channel walls 54, 56 into three individual chambers each with a small entrance 50 and a small exit 52. The blade neck 10 is configured to be correspondingly thin-walled. In order to achieve an adequate structural stability of the blade neck 10, the cooling channels 30, 32, 34 are aligned according to the blade pan 12. For this, the channel walls 54, 56 have a freeform contour and are designed according to structural mechanical criteria. To adjust a high temperature gradient between the cold base body 6 and the respective hot blade pan 12, a heat-transmitting overall cross section of the blade neck 10, which is formed by the channel walls 54, 56 and the side walls 46, 48, is smaller than a cross section of the blade root or adapter 8.

Turbulators 60 for regional vortexing of the cooling air partial flows are disposed in the expanded sections of the cooling channels 30, 32, 34 between a fictitious channel axis 58, which extends between the inlet 50 and the outlet 52 and is sketched in the cooling channel 30, and the platform 14, i.e., according to the depictions in FIGS. 1 and 2 above the channel axis 58 and beneath the platform 14. The turbulators extend between the channel walls 54 and 56 or between a channel wall 54, 56 and a side wall 46, 48 of the blade neck 10 and are configured as ribs projecting into the expanded sections.

During operation, a respective cooling air partial flow flows through the cooling channels 30, 32, 34 and therefore flows through the blade neck 10 from the high-pressure side to the low-pressure side. The cooling air is vortexed into the cooling channels 30, 32, 34 via the turbulators 60, thereby achieving an improved heat transmission to the cooling air partial flows. In addition, a respective cooling air partial flow flows through the passages 28, thereby effecting an outer cooling of the blade roots 8. The passages may be closed, however, on the end side, i.e., on the low-pressure side by a plate-like sealing element (not shown) for example or have a tapered cross section so that the cooling air flow is guided exclusively or preferentially through the cooling channels 30, 32, 34.

A blade for a turbomachine is disclosed, wherein at least one cooling channel is configured in the blade neck, whose inlet is disposed near a platform projection on the high-pressure side and whose outlet is disposed in the region of a platform projection on the low-pressure side, an integrally bladed rotor base body having a plurality of these types of blades as well as a turbomachine with such a rotor base body.

LIST OF REFERENCE NUMBERS

1 Rotor base body
2 Rotor blade
4 Rotor blade
6 Base body
8 Blade root
10 Blade neck
12 Blade pan
14 Platform
16 Front projection
18 Rear projection
20 Base
22 Side wall
24 Side wall
26 Body wall
28 Passage
30 Cooling channel
32 Cooling channel
34 Cooling channel
36 Annular space
38 Cooling chamber
40 Sealing element
42 Insertion groove
44 Insertion groove
46 Side wall
48 Side wall
50 Inlet
52 Outlet
54 Channel wall
56 Channel wall
58 Channel axis
60 Turbulators The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A blade for a turbomachine, comprising:

a blade root, wherein the blade root is attached to a base of a rotor base body, wherein the blade root has a concave side wall, wherein the concave side wall merges in a flush manner with a wall of the rotor base body which extends between the base and an adjacent base with an adjacent blade root, and wherein the concave wall defines a passage between the blade root and the adjacent blade root for a first cooling air partial flow;

a blade neck associated with the blade root;

a blade pan; and a platform disposed between the blade neck and the blade pan, wherein the platform includes a front projection and a rear projection, as viewed in a flow direction of a hot gas flow, and wherein a cool cooling air flow is delimitable from the hot gas flow by the front projection and the rear projection;

wherein the blade neck includes at least one cooling channel, wherein a second cooling air partial flow is guidable through the at least one cooling channel, and wherein an inlet of the at least one cooling channel is disposed in a region of the front projection and is disposed radially inwardly and wherein an outlet of the at least one cooling channel is disposed in a region of the rear projection and is disposed radially outwardly such that an axis of the at least one cooling channel is pointed diagonally outwardly;

wherein the at least one cooling channel has an expanded section between the inlet and the outlet;

wherein a turbulator is disposed in the expanded section of the at least one cooling channel;

and wherein the turbulator is spaced apart from a channel axis extending between the inlet and the outlet.

2. The blade according to claim 1, wherein the at least one cooling channel comprises a plurality of cooling channels.

3. The blade according to claim 2, wherein the plurality of cooling channels are disposed next to each other in a blade transverse direction.

4. The blade according to claim 1, wherein the blade neck has two side walls, wherein an insertion groove is disposed in each of the two side walls, and wherein a respective radial sealing element is disposable in a respective insertion groove.

5. The blade according to claim 1, wherein a rounded transitional section of the front projection of the platform forms an edge section of the inlet and wherein a rounded transitional section of the rear projection of the platform forms an edge section of the outlet.

6. A rotor base body, comprising a plurality of blades according to claim 1.

7. The rotor base body according to claim 6, wherein the plurality of blades are integrally attached to the rotor base body.

8. The rotor base body according to claim 6, wherein the plurality of blades are detachably mounted to the rotor base body.

9. A turbomachine, comprising:

a rotor with a rotor base body according to claim 6.

10. A blade for a turbomachine, comprising:

a blade root, wherein the blade root is attached to a base of a rotor base body, wherein the blade root has a concave side wall, wherein the concave side wall merges in a flush manner with a wall of the rotor base body which extends between the base and an adjacent base with an adjacent blade root, and wherein the concave wall defines a passage between the blade root and the adjacent blade root for a cooling air flow;

a blade neck associated with the blade root;

a blade pan; and a platform disposed between the blade neck and the blade pan, wherein the platform includes a front projection and a rear projection;

wherein the blade neck includes a cooling channel and wherein an inlet of the cooling channel is disposed in a region of the front projection and is disposed radially inwardly and wherein an outlet of the cooling channel is disposed in a region of the rear projection and is disposed radially outwardly such that an axis of the cooling channel is pointed diagonally outwardly;

wherein the cooling channel has an expanded section between the inlet and the outlet;

wherein a turbulator is disposed in the expanded section of the cooling channel;

and wherein the turbulator is spaced apart from a channel axis extending between the inlet and the outlet.

11. The blade according to claim 10, wherein a rounded transitional section of the front projection of the platform forms an edge section of the inlet and wherein a rounded transitional section of the rear projection of the platform forms an edge section of the outlet.

* * * * *